US008547295B2

(12) United States Patent
Vidal et al.

(10) Patent No.: US 8,547,295 B2
(45) Date of Patent: Oct. 1, 2013

(54) MOTION SIMULATOR AND DISPLAY SYSTEM TYPICALLY USING LIGHT-EMITTING DIODES

(75) Inventors: Marcial Vidal, Merritt Island, FL (US); Haizhang Li, Orlando, FL (US)

(73) Assignee: Video Display Corporation, Tucker, GA (US)

( * ) Notice: Subject to any disclaimer, the term of this patent is extended or adjusted under 35 U.S.C. 154(b) by 895 days.

(21) Appl. No.: 12/578,544

(22) Filed: Oct. 13, 2009

(65) Prior Publication Data

US 2010/0097304 A1 Apr. 22, 2010

Related U.S. Application Data

(60) Provisional application No. 61/196,263, filed on Oct. 16, 2008.

(51) Int. Cl.
*G09G 5/00* (2006.01)
(52) U.S. Cl.
USPC ............................................................ 345/1.3
(58) Field of Classification Search
USPC ................................................... 345/1.1–3.4
See application file for complete search history.

(56) References Cited

U.S. PATENT DOCUMENTS

| 4,857,801 | A | 8/1989 | Farrell | |
|---|---|---|---|---|
| 5,410,328 | A | * | 4/1995 | Yoksza et al. ................... 345/82 |
| 6,042,238 | A | * | 3/2000 | Blackham et al. .............. 353/94 |
| 6,065,854 | A | | 5/2000 | West et al. |
| 6,314,669 | B1 | | 11/2001 | Tucker |
| 6,944,581 | B2 | | 9/2005 | Creek |
| 7,012,669 | B2 | | 3/2006 | Streid et al. |
| 7,350,942 | B2 | | 4/2008 | Chen et al. |

OTHER PUBLICATIONS

Amery et al., "Flight Simulation Visual Requirements and a New Display System", *Cockpit Displays VI: Displays for Defense Applications, Procs. SPIE*, vol. 3690, Aug. 16, 1999, pp. 356-367.
Antoniadis, "Overview of OLED Display Technology", OSRAM Opto Semiconductors, undated, circa 2003, 32 pp.
Patrick et al, "Using a Large Projection Screen as an Alternative to Head-Mounted Displays for Virtual Environments", *CHI Letters*, Apr. 1-6, 2000, pp. 478-485.
Svilainis, "Considerations of the Driving Electronics of LED Video Display", Information Technology Interfaces, *Procs. ITI 2007 29th Int'l Conf. Info. Tech. Interfaces*, Jun. 25-28, 2007, pp. 431-436.

(Continued)

*Primary Examiner* — Michael Pervan
(74) *Attorney, Agent, or Firm* — Ronald J. Meetin

(57) ABSTRACT

A light-emissive module (114), typically utilizing one or more LEDs (132R, 132G, and 132B), is configured so that the maximum intensity of the module's light emission occurs along a direction (138) materially non-perpendicular to the back surface (136) of the module's supporting body (130). An active image-generating screen (102) contains a plurality of block facets (112), each containing a plurality of the light-emissive modules arranged so that their maximum light-intensity directions are largely the same. The block facets are configured to approximate a curved surface. The maximum light-intensity directions (158) of the block facets are thus materially slanted to one another. The image-generating screen presents a video image. A display system suitable for a motion simulator, such as a flight simulator, is formed by combining the screen with a reflective collimator (104).

44 Claims, 6 Drawing Sheets

(56) References Cited

OTHER PUBLICATIONS

Tan et al, "With similar visual angles, larger displays improve performance on spatial tasks", *Procs. SIGCHI conf. Human factors in computing systs.*, 2003, pp. 217-224.

"Barco's new cross-cockpit collimated display solution selected for U.S. Air Force B-2 training program", Press Release, Barco Simulation USA, Nov. 21, 2007, 1 p.

"C-Series Collimated Displays, FAA and JAA Level D Certified Display Solution", Equipe Electronics, 2008, 1 p.

"Mitsubishi show 155 inch OLED-Tv consists of 720 10-centimeter-square panels", OLED-Display.net, Oct. 7, 2009, 4 pp.

"OLED Tutorial", *WAVE Report*, Jan. 24, 2007, 3pp.

"OPTEK develops new surface mount RGB LED", Optek Technology, Jan. 30, 2008, 1 p.

"SMT Surface Mount and Ceramic-Based Multichip Sunlight Visible Full-Spectrum RGB LEDs", LEDtronics, 2008, 3 pp.

"TLC5946, 16-Channel, 12-Bit PWM LED Driver with 6-Bit Dot Correction", Texas Instruments, Jun. 2008, 28 pp., and addenda, Aug. 2008 and Feb. 1999, 12 pp.

\* cited by examiner

MOTION SIMULATOR AND DISPLAY SYSTEM TYPICALLY USING LIGHT-EMITTING DIODES

CROSS-REFERENCE TO RELATED APPLICATION

This claims priority to U.S. provisional patent application 61/196,263, filed 16 Oct. 2008, the contents of which are incorporated by reference to the extent not repeated herein.

FIELD OF USE

This relates to motion simulators, such as flight simulators, and to display systems suitable for motion simulators.

BACKGROUND ART

Flight simulators conventionally employ wide-angle panoramic collimated projection displays that provide high-fidelity seamless imagery for cross-cockpit/cab viewing. FIG. 1 illustrates such a conventional cross-cockpit flight simulator consisting of simulator cockpit 20 and a cross-cockpit flight-simulation display system formed with a group of video projectors 22, spherically curved back-projection screen 24, and spherically curved collimating mirror 26. Projectors 22 project video images onto the back of screen 24. The video images pass through back-projection screen 24 and appear on its front surface. Collimating mirror 26 reflectively collimates the scattered image light coming from the front of screen 24 to produce a composite virtual image of the images projected by projectors 22. In particular, rays of the light reflected by collimating mirror 26 after being scattered from any point on the front of screen 24 travel largely parallel to one another and are thus collimated. The virtual image produced by collimating mirror 26 is viewable at cockpit 20. At least three projectors 22 are normally needed to achieve the commonly desired viewing angles of 180°-220° horizontally and 40°-60° vertically at cockpit 20.

For the purpose of better understanding the projection optics, FIG. 2 presents a side view of the conventional flight simulator of FIG. 1 as taken along a vertical plane through the projection axis of one of projectors 22. This projector 22 is referred to here as illustrated projector 22. Item 28 in cockpit 20 indicates a viewer, specifically one of the viewer's eyes.

Illustrated projector 22 and spherically curved screen 24 are arranged so that light rays 30 of the image projected by illustrated projector 22 impinge on the concave back surface of screen 24. A group of light rays 30 distributed across the exit aperture of illustrated projector 22 impinge on each different point on the back of screen 24. FIG. 2 illustrates only one light ray 30 in each such group of rays 30. Part of the light formed by light rays 30 passes through screen 24 and is scattered forward (in various directions). Some of the forward-scattered light reflects off the concave surface of collimating mirror 26 and reaches viewer 28. Items 32 in FIG. 2 indicate rays of this forward scattered light. Items 34 in FIG. 2 indicate the reflected light rays that reach viewer 28.

Items 36 in FIG. 2 indicate central axes of the groups of light rays 30 impinging on different points on the back of spherically curved screen 24. Although central axes 36 are illustrated as being largely perpendicular to respective planes locally tangent to screen 24 in the conventional flight-simulation display system depicted in FIG. 2, this is generally not required in projector-based prior art flight simulators. In any event, the maximum intensity of the forward-scattered light generally occurs along central axes 36. In order for viewer 28 to receive reflected light rays 34, collimating mirror 26 is tilted relative to screen 24. As a result, scattered light rays 32 do not travel along central axes 36. The intensity of the light provided by off-axis scattered light rays 32 is less than the intensity of the forward-scattered light traveling along central axes 36. The intensity of the reflected light reaching viewer 28 is reduced, thereby causing the light-processing efficiency of the conventional projector-based flight-simulation display system of FIGS. 1 and 2 to be reduced.

Additionally, the tilting of collimating mirror 26 to screen 24 commonly produces severe image distortion and astigmatism. The noise level of the blend zones is twice as much as the surrounding area. This significantly reduces the contrast and can cause poor image uniformity across the full field of view. In short, the image intensity and image quality of the conventional flight-simulation display system of FIGS. 1 and 2 are often undesirably low.

Furthermore, the geometric complexity of projector-based flight-simulation display systems such as that of FIGS. 1 and 2 commonly causes setup, maintenance and monitoring costs to be very high. Performing image blending between adjacent channels across the projector overlap regions for reducing mismatch of brightness, contrast and color is invariably laborious and time consuming. The cost of replacing light sources in projector-based flight-simulation display systems is considerable due to short lifetimes of light sources currently used in these projector-based systems.

It would be desirable to have a flight-simulation display system having higher light-processing efficiency, as well as greater image intensity and better image quality, than conventional projector-based flight-simulation display systems such as that of FIGS. 1 and 2. It would also be desirable to avoid the various difficulties arising from use of multiple projectors. In addition, it would be desirable for the flight-simulation display system to take advantage of advances in light-source technology, especially in light-emitting diodes.

GENERAL DISCLOSURE OF THE INVENTION

The present invention provides such a flight-simulation display system. A building block of the present flight-simulation display system is a light-source module having novel geometrical characteristics in accordance with the invention. The light-source module includes a light-providing device and a supporting body having a mounting surface and a further surface, referred to as the back surface, generally opposite the mounting surface.

The light-providing device is mounted on the mounting surface for providing light at an intensity having a maximum that occurs in a maximum light-intensity direction materially non-perpendicular to the body's back surface. This is typically achieved by configuring the mounting surface of the supporting body to be materially slanted to its back surface. The mounting and back surfaces are normally largely flat.

The light-providing device normally includes at least one light-emissive element for emitting light of largely a selected color. Preferably, the light-providing device contains three light-emissive elements which respectively emit light of three selected colors capable of being combined to produce white light. The three colors of light normally are red, green, and blue. This enables the light-providing device to furnish light of largely any color across the visible spectrum.

Each light-emissive element is preferably a light-emitting diode ("LED"). Electronic circuitry in the supporting body normally controls light provided from the light-providing device. Consequently, the present light-source module is self contained.

A light-emissive structure, generally referred to as a light-emissive block facet, contains a plurality of the inventive light-source modules configured so that the back surfaces of their supporting bodies extend largely parallel to one another. More particularly, the back surfaces of the supporting bodies of the modules are normally largely coplanar. The maximum light-intensity directions of the light-providing devices in the modules are preferably all largely the same. Accordingly, the light-emissive block facet emits light at an intensity whose maximum is in a direction largely the same as the maximum light intensity direction of any of the light-source modules.

The light-source modules in the block facet are preferably arranged in rows and columns so that the mounting surfaces of the supporting bodies of the modules in each column extend generally in respective largely parallel planes spaced apart from one another. In addition, the mounting surfaces of the supporting bodies of the modules in each row are normally largely coplanar. Even though the mounting surfaces of the supporting bodies of the modules in each column extend generally in different largely parallel planes, the maximum light-intensity directions of the light-providing devices in the modules are still all largely the same. Consequently, the maximum intensity of the overall light emitted by the block facet still occurs in largely the same direction as that of any of the light-source modules.

An image-generating screen configured in accordance with the invention and/or as to be suitable for use in the present flight-simulation display system contains a plurality of light-emissive components connected together for actively generating an image. The light-emissive components are, as a group, normally shaped approximately like a thin shell. Each light-emissive component has a light-providing surface and a further surface, referred to as the back component surface, generally opposite the light-providing surface. Light emitted from each light-emissive component emanates from its light-providing surface with an intensity having a maximum that occurs in a maximum light-intensity direction materially non-perpendicular to its back component surface.

The back surfaces of the light-emissive components are materially slanted relative to one another so as to approximate a three-dimensional curved surface, typically a spherically curved surface. Due to the slanting of the back component surfaces, the maximum light-intensity directions of the light-emissive components are materially slanted relative to one another. As a result, the active image-generating screen of the present invention is similar to a curved passive back-projection screen except that light is emitted from the present active image-generating screen instead of being projected through the screen.

Each of the light-emissive components in the present active image-generating screen is configured similarly to the above-described light-emissive block facet. In particular, each light-emissive component normally contains a plurality of light-emissive modules that function as light sources. Each module is formed with a light-providing device and a supporting body having a mounting surface and a further surface, referred to as the back surface, generally opposite the mounting surface. The light-providing device of each module is mounted on the mounting surface of that module's supporting body for emitting light at an intensity having a maximum that occurs largely in the light-emissive component's maximum light-intensity direction. The back surfaces of the supporting bodies of the modules in each light-emissive component normally extend largely parallel to one another and materially non-perpendicular to that component's maximum light-intensity direction.

The modules of each light-emissive component are preferably arranged in rows and columns. The mounting surfaces of the supporting bodies of the modules in each column of modules in that light-emissive component extend generally in respective largely coplanar planes spaced apart from one another. Additionally, the mounting surfaces of the supporting bodies of the modules in each row of modules in each light-emissive component are normally largely coplanar. In short, each light-emissive component can be implemented as the above-described block facet.

In one aspect of the invention, a display system suitable for a motion simulator is created by combining the present active image-generating screen with a collimator for collimating light provided from the screen in order to substantially replicate the image generated by the screen. More particularly, the collimator reflectively collimates light emitted from the light-emissive components. The curved surface approximated by the back surfaces of the light-emissive components is preferably of approximately spherical curvature. In that case, the collimator has a surface of generally spherical curvature for reflectively collimating light emitted from the light-emissive components.

In another aspect of the invention, a display system suitable for a motion simulator is formed with an LED-containing image-generating screen and a collimator. The image-generating screen contains a multiplicity of LEDs for generating an image. The collimator collimates light provided from the LEDs in order to substantially replicate the image. Preferably, the collimator substantially replicates the image by reflectively collimating light emitted by the LEDs.

The LEDs are normally deployed among a plurality of light-emissive components configured as generally described above for the light-emissive components of the active image-generating screen used in the display system of the first aspect of the invention. Accordingly, the curved surface approximated by the back surfaces of the light-emissive components is preferably of approximately spherical curvature. The collimator then has a surface of generally spherical curvature for reflectively collimating light emitted from the light-emissive components. In addition, the light-providing device in each module of each light-emissive component contains at least one LED, preferably three LEDs which respectively emit light of three selected colors, e.g., red, green, and blue, capable of being combined to produce white light. Electronic circuitry in the supporting bodies of the modules normally controls light provided from the modules' light-providing devices.

The curved surface of the collimator of the display system in both aspects of the invention is tilted relative to the curved surface approximated by the back surfaces of the light-emissive components of the image-generating screen. The maximum light-intensity directions of the light-emissive components then differ from being respectively perpendicular to the back component surfaces by angles, preferably approximately equal, that collectively largely match the tilt of the curved surface of the collimator relative to the curved surface approximated by the back component surfaces. This effectively nulls out the collimator-to-screen tilt so that the light provided from the image-generating screen to the collimator is at largely the maximum intensity. The light-processing efficiency of the display system is very high.

A motion simulator, such as a flight simulator, is formed in accordance with the invention by combining the display system in either aspect of the invention with a station for receiving a person so that the person can see the replicated image by receiving light collimated by the collimator after being emitted from the light-emissive components. For a flight simulator, the collimator presents a moving picture as seen from the cockpit of an airplane. The station constitutes the simulator cockpit.

With the present display system configured so that the maximum light-intensity directions of the light-emissive components differ from being respectively perpendicular to the back component surfaces by angles that collectively largely match the tilt of the curved surface of the collimator relative to the curved surface approximated by the back component surfaces, a person in the station receives light provided from the light-emissive components of the image-generating screen largely along their maximum light-intensity directions. As a consequence, the light-processing efficiency of the present display system is considerably higher than the light-processing efficiency of the conventional flight-simulation display system of FIGS. 1 and 2.

Additionally, configuring the present display system so that an observer in the simulator station receives light provided from the light-emissive components of the image-generating screen largely along their maximum light-intensity directions greatly reduces image distortion and astigmatism. The quality and intensity of the virtual image seen by the observer are both very high.

The present display system does not need any video projector(s) and thereby avoids the various difficulties, such as reduced contrast and poor image uniformity across the full field of view, arising from use of multiple projectors. By implementing the light-source modules with LEDs, the invention can take advantage of advances in LED technology, especially advances in LED surface-mount technology and organic LED technology. The invention thus provides a large advance over the prior art.

BRIEF DESCRIPTION OF THE DRAWINGS

Like reference symbols are employed in the drawings and in the Description of the Preferred Embodiments to represent the same, or very similar, item or items.

DESCRIPTION OF THE PREFERRED EMBODIMENTS

Figure 3:
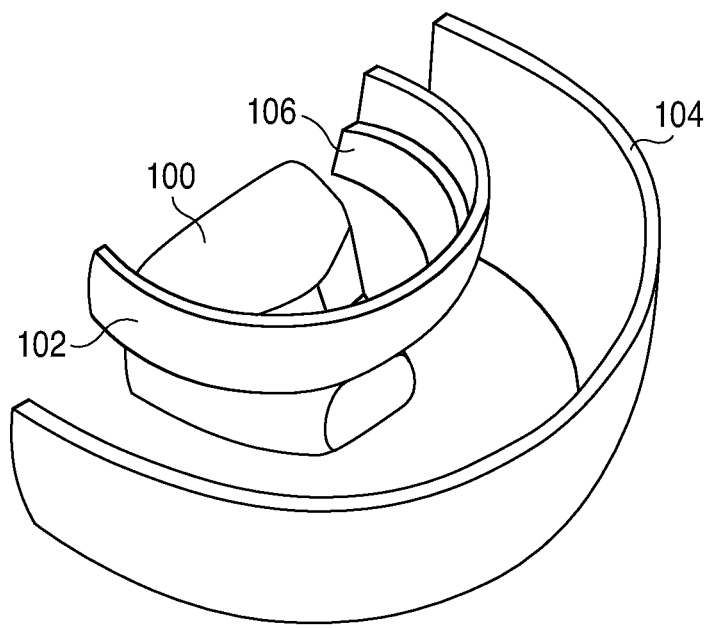
FIG. 3 is a perspective view of a cross-cockpit flight simulator configured according to the invention.

FIG. 3 illustrates a cross-cockpit flight simulator configured in accordance with invention. This flight simulator consists of a simulator cockpit 100 and a cross-cockpit flight-simulation display system formed with an active image-generating screen 102 of approximately spherical curvature, a collimating mirror 104 of spherical curvature, and screen supporting structure 106. Active image-generating screen 102 is generally shaped like a thin shell. The approximately spherically curved front (outside) surface of image-generating screen 102 has regular variations described below but, for simplicity, not illustrated in FIG. 3. Screen supporting structure 106, shown very generally in FIG. 3, physically supports image-generating screen 102 and contains some of the image-generating electronic circuitry.

Active image-generating screen 102, sometimes referred to as an image-generating thin-shell structure, actively generates a video image of a simulation of the external environment as seen through the window or windows of the cockpit of an airplane. The actively generated video image is presented on the concave front surface of screen 102. As used here in describing the light generated by screen 102, the term "actively" or "active" means that screen 102 produces the light in the first instance rather than operating, e.g., by transmission, reflection, scattering, and so on, on light produced elsewhere.

Spherically curved collimating mirror 104 reflectively collimates light of the video image generated by screen 102 to produce a virtual image viewable at cockpit 100. The virtual image is a substantial replica of the image generated by screen 102. In particular, rays of the light reflected by collimating mirror 104 after being provided from any point on the front surface of screen 102 travel largely parallel to one another and are thereby collimated to produce the replicated image. The flight-simulation display system of FIG. 3 provides a horizontal viewing angle of 180°-220° or more and a vertical viewing angle of 40°-60° or more. The horizontal viewing angle can readily be 360°.

Figure 4:
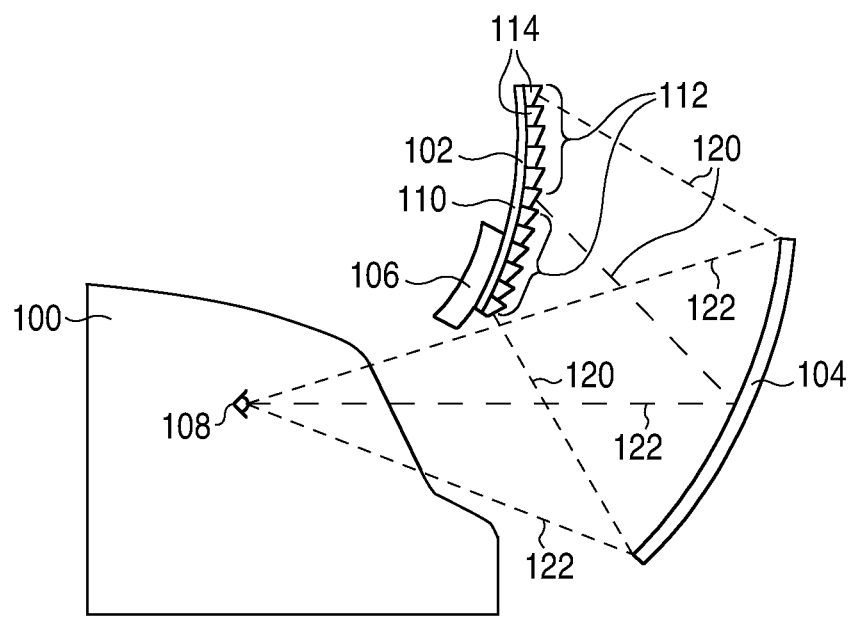
FIG. 4 is a side view of the inventive flight simulator of FIG. 3 taken along a vertical plane through the simulator cockpit.

FIG. 4 presents a simplified side view of the inventive flight simulator of FIG. 3 as taken along a vertical plane for the purpose of illustrating the basic configuration of image-generating screen 102 and explaining the display-system optics. Item 108 in cockpit 100 indicates a viewer, specifically one of the viewer's eyes. Spherically curved collimator 104 is physically tilted relative to spherically curved image-generating screen 102 for enabling viewer 108 to see the virtual image presented by collimator 104. However, screen 102 is internally configured to effectively null out the collimator-to-screen tilt.

Image-generating screen 102 consists of a screen (or shell) backplate 110 of approximately spherical curvature and a plurality of light-emissive components 112 mounted on the front (outside) surface of screen backplate 110 so as to be connected together by backplate 110. Light-emissive components 112, generally referred to as light-emissive block facets, are arranged in an array of approximately spherically curved rows and columns as described below in connection with FIGS. 7a and 7b so that each light-emissive block facet 112 provides a different portion of the video image generated by screen 102. Two light-emissive block facets 112 in one column appear in the simplified side view of FIG. 4. An actual implementation of the flight-simulation system of FIGS. 3 and 4 has 16-64 rows, typically 32 rows, of block facets 112 and 16-64 columns, typically 32 columns, of block facets 112. Block facets 112 vary in lateral size depending on how far they are away from the upper and lower edges of screen 102.

Each of light-emissive block facets 112 emits light with an intensity having a maximum that occurs in a maximum light-intensity direction for that block facet 112. The maximum light-intensity direction for each block facet 112 is different from the maximum light-intensity direction for each directly adjacent block facet 112 and normally from each other block facet 112.

Each light-emissive block facet 112 contains a plurality of largely identical light-emissive modules 114 arranged in an array of largely straight rows and columns so that each light-emissive module 114 provides a different segment of the image portion provided by that block facet 112. In the simplified side view of FIG. 4, each block facet 112 has six light-emissive modules 114 in one column. The numbers of rows and columns of light-emissive modules 114 are preferably the same in each block facet 112. An actual implementation of the flight-simulation system of FIGS. 3 and 4 has 16-64 rows, typically 32 rows, of light-emissive modules 114 and 16-64 columns, typically 32 columns, of modules 114 in each block facet 112. The row/column arrangement of light-emissive modules 114 in each block facet 112 is described further below in connection with FIGS. 6, 7a, and 7b.

Light-emissive modules 114 emit light that forms the video simulation image. The emitted light travels generally away from the convex front surface of image-generating screen 102. Each module 114 is characterized by a central axis that extends in a maximum light-intensity direction for that module 114. The intensity of the light emitted by each module 114 is maximum along that module's central axis and thus in the module's maximum light-intensity direction.

The central axes of all light-emissive modules 114 in any light-emissive block facet 112 are largely parallel to one another. Consequently, the maximum light-intensity directions of all modules 114 in any block facet 112 are largely the same. Accordingly, the maximum light-intensity direction of any block facet 112 is substantially the same as the maximum light-intensity direction of any module 114 in that block facet 112.

Some of the rays of light emitted by light-emissive modules 114 are indicated by items 120 in FIG. 4. Modules 114 are configured so that each light ray 120 travels along, or nearly along, the central axis of module 114 which emitted that ray 120 and thus in the maximum light-intensity direction of that module 114. In other words, light rays 120 largely constitute rays of maximum intensity (light) emitted by modules 114.

Items 122 in FIG. 4 represent light rays which are respectively produced by reflection of light rays 120 off the concave surface of collimator 104 and which reach viewer 108 to produce the virtual image seen by viewer 108. Since light rays 120 largely constitute rays of maximum intensity emitted by modules 114, the light received by viewer 108 to produce the virtual image is of largely the maximum available intensity. Consequently, the light-processing efficiency of the flight-simulation display system of FIGS. 3 and 4 is very high.

Figure 5:
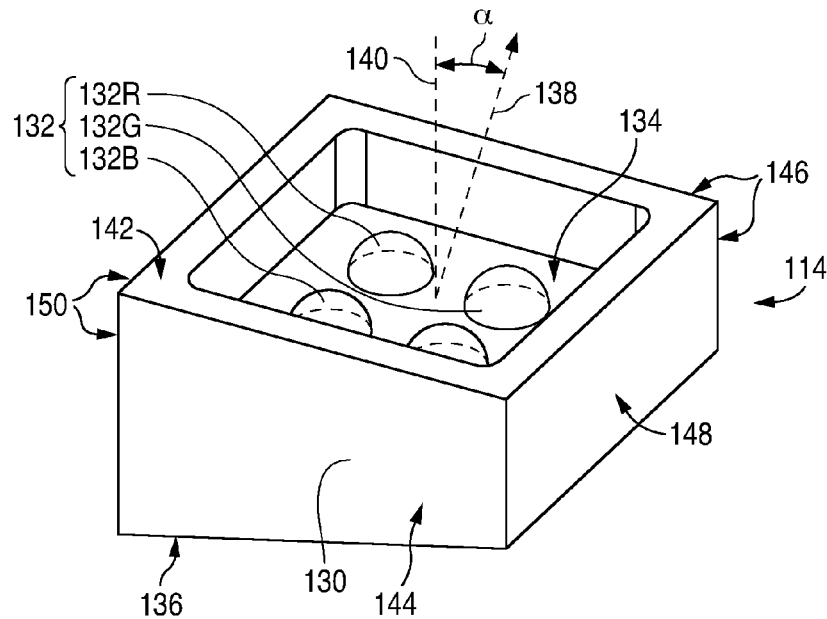
FIG. 5 is a perspective view of a surface-mount tricolor LED module configured according to the invention for use in the inventive flight simulator of FIGS. 3 and 4.

FIG. 5 illustrates one of light-emissive modules 114 configured as a surface-mount tricolor LED module. Illustrated module 114 consists of a surface-mount supporting body 130 and a light-providing device 132. Supporting body 130 has a largely flat approximately rectangular mounting surface 134 and a flat rectangular back surface 136 generally opposite mounting surface 134. Light-providing device 132 is mounted on mounting surface 134 for providing light at an intensity having a maximum that occurs along the module's central axis 138 in a maximum light-intensity direction materially non-perpendicular to back surface 136. Central axis 138, illustrated with an arrow directed away from illustrated module 114, also represents its maximum light-intensity direction.

Item 140 in FIG. 5 is a line perpendicular to back surface 136. Back-surface perpendicular line 140 of light-emissive module 114 is at a tilt angle α to central axis 138. Mounting surface 134 is slanted by substantially module tilt angle α to back surface 136. Module tilt angle α is normally 10°-50° depending on various factors including the lateral area occupied by the module's light-emissive block facet 112 and the tilt of collimator 104 to image-generating screen 102.

Light-providing device 132 is situated in a cavity in supporting body 130. The cavity is defined by four interconnected sidewalls of supporting body 130 and mounting surface 134 on which light-providing device 132 is mounted. Hence, mounting surface 134 is recessed into supporting body 130. The upper surfaces of the sidewalls, in the orientation of illustrated module 114 presented in FIG. 5, form a flat front (or top) surface 142 of supporting body 130. Front surface 142 is generally shaped like a rectangular annulus and extends largely parallel to recessed mounting surface 134. Accordingly, supporting body 130 is shaped generally like a truncated wedge with a cavity along one side surface.

Supporting body 130 has a pair of opposite largely identical generally trapezoidal side surfaces 144 and 146 and a pair of opposite generally rectangular side surfaces 148 and 150 that extend between trapezoidal side surfaces 144 and 146. Inasmuch as only the edges of side surfaces 146 and 150 are visible in FIG. 5, the locations of side surfaces 146 and 150 are indicated in FIG. 5 by arrows pointing to their side and top edges. Rectangular side surface 148 is referred to as the small rectangular side surface because it extends between the shorter ones of the parallel edges of trapezoidal side surfaces 144 and 146. In a complementary manner, rectangular side surface 150 is referred to as the large rectangular side surface because it extends between the longer ones of the parallel edges of trapezoidal side surfaces 144 and 146.

Light-providing device 132 consists of three surface-mount LEDs 132R, 132G, and 132B which respectively emit red, green, and blue light that travels away from mounting surface 134 and out of the cavity in supporting body 130. The color light emitted by each LED 132R, 132G, or 132B has a maximum intensity along central axis 138 in the module's maximum light-intensity direction. The red, green, and blue light emitted by LEDs 132R, 132G, or 132B can be suitably combined to produce light of largely any color across the visible spectrum. The light emitted by LEDs 132R, 132G, or 132B can also be combined to produce white light.

Supporting body 130 contains electronic circuitry (not shown in FIG. 5) for controlling the light provided from each LED 132R, 132G, or 132B and thus from light-providing device 132. This circuitry consists at least of electrical conductors which carry voltages for controlling LEDs 132R, 132G, and 132B.

Figure 6:
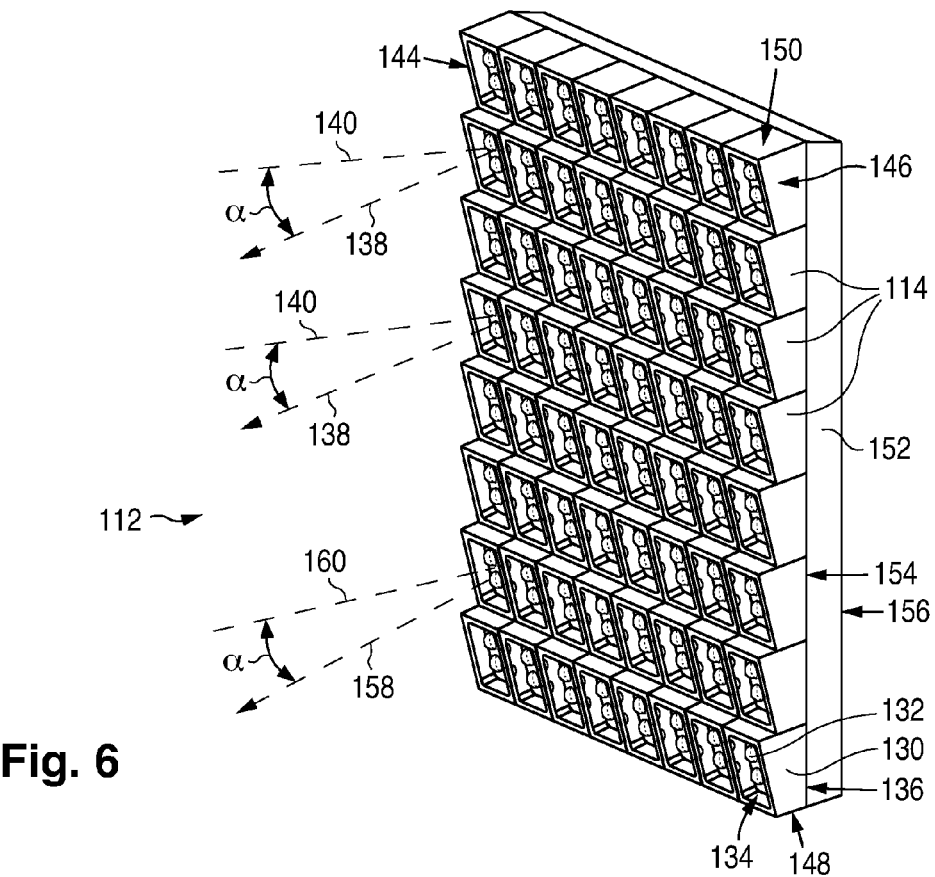
FIG. 6 is a perspective view of a light-emissive block facet configured according to the invention to include a plurality of the inventive surface-mount LED modules of FIG. 5.

FIG. 6 illustrates an example of light-emissive block facet 112 that contains 64 light-emissive modules 114 arranged in eight straight rows and eight straight columns. As mentioned above, a block facet 112 typically contains 32 rows of modules 114 and 32 columns of modules 114. This amounts to 1,024 modules and is sixteen times greater than the number of modules 114 present in block facet 112 illustrated in FIG. 6.

Illustrated light-emissive block facet 112 includes a flat rectangular block backplate 152 having a front block surface 154 and a back block surface 156. Block backplate 152 includes part of the electronic circuitry used for producing the image portion generated by illustrated block facet 112. Light-emissive modules 114 of illustrated block facet 112 are mounted on block backplate 152 so that back surface 136 of supporting body 130 of each module 114 is directly adjacent to front block surface 154. Since back plate 152 is flat, back surfaces 136 of supporting bodies 130 of the block facet's modules 114 are largely coplanar. In addition, back supporting-body surfaces 136 are largely parallel to back block surface 156.

The curved lateral area of image-generating screen 102 is divided into an array of approximately spherically curved rows and columns of pixels, each formed by a different one of light-emissive modules 114. The curved pixel rows are analogous to lines of latitude while the curved pixel columns are analogous to lines of longitude. Due to the approximately spherical curvature of screen 102, block-facets 112 are normally arranged in screen 102 so that the column-to-column spacing of the pixel columns is a maximum along a selected latitude, referred to as zero latitude, between the top and bottom edges of screen 102 and decreases in moving vertically away from the zero-latitude location. Each of block facets 112, except possibly block facets 112 along the zero-latitude location, is therefore shaped laterally like an isosceles trapezoid. That is, the bottom edge of each trapezoidal block facet 112 is either longer or shorter than the top edge of that block facet 112. As a consequence, the center-to-center spacing of light-emissive modules 114 in each module row of each trapezoidal block facet 112 increases or decreases somewhat in going from the first module row to the last module row.

Subject to the preceding comments about the lateral shapes of block facets 112, light-emissive modules 114 in each module row of illustrated block facet 112 touch, or nearly touch, modules 114 in each adjacent module row. Modules 114 in each module column similarly touch, or nearly touch, modules 114 in each adjacent module column. The lateral area of back block surface 156 is thus close to the sum of the lateral areas of back supporting-body surfaces 136 of modules 114.

Light-emissive modules 114 of illustrated light-emissive block facet 112 are deployed across block backplate 152 so that (i) trapezoidal side surfaces 146 of module supporting bodies 130 face trapezoidal side surfaces 144 of supporting bodies 130 in the module rows and (ii) large rectangular side surfaces 150 of supporting bodies 130 face small rectangular side surfaces 148 of supporting bodies 130 in the module columns. This enables central axes 138 of all of modules 114 in illustrated block facet 112 to extend largely parallel to one another. Accordingly, maximum light-intensity directions 138 of modules 114 in illustrated block facet 112 are largely the same.

Additionally, the maximum light-intensity direction 158 of illustrated block facet 112 is largely the same as maximum light-intensity direction 138 of each module 114 in illustrated block facet 112. Item 160 in FIG. 6 is a line perpendicular to back block surface 156. Since back supporting-body surfaces 136 are largely parallel to back block surface 156, back-surface perpendicular line 160 of illustrated block facet 112 is slanted to maximum light-intensity direction 158 of illustrated block facet 112 by a block tilt angle largely equal to module tilt angle $\alpha$.

Light-emissive modules 114 are, as indicated above, normally largely identical. Consequently, mounting surfaces 134 of supporting bodies 130 of modules 114 in each module column normally extend generally in respective largely parallel planes spaced apart from one another. Mounting surfaces 134 of supporting bodies 130 of modules 114 in each module row are normally largely coplanar.

Figure 7A:
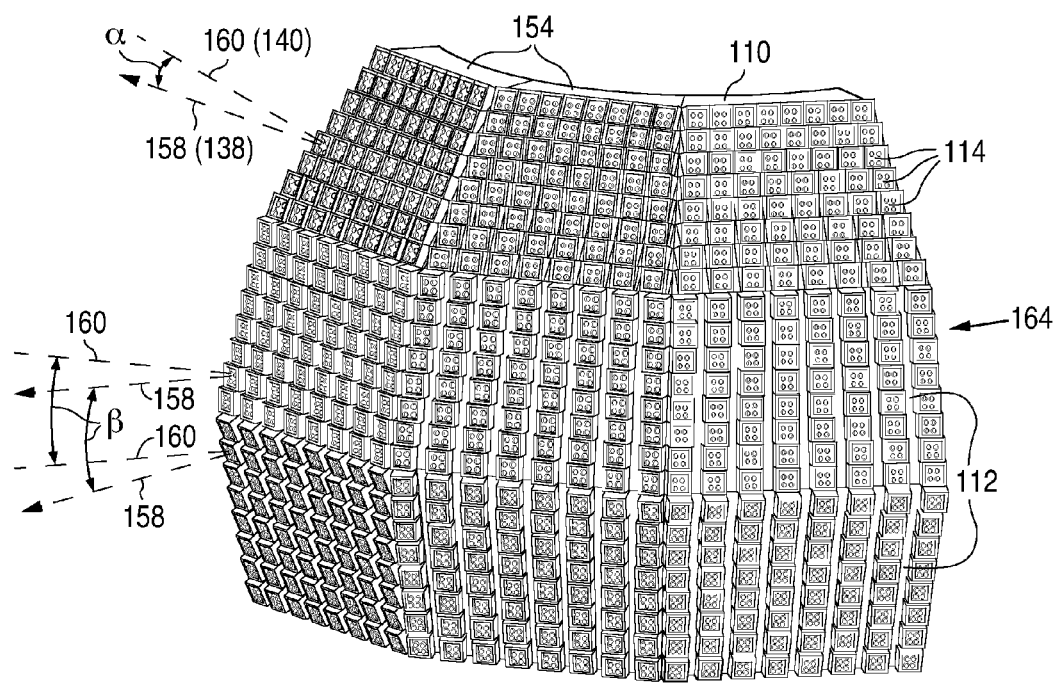
FIGS. 7a and 7b are respective front and back perspective views of a portion of the light-emissive curved active image-generating screen used in the display system of the inventive flight simulator of FIGS. 3 and 4. This portion of the image-generating screen contains multiple units of the light-emissive block facets of FIG. 6.
Figure 7B:
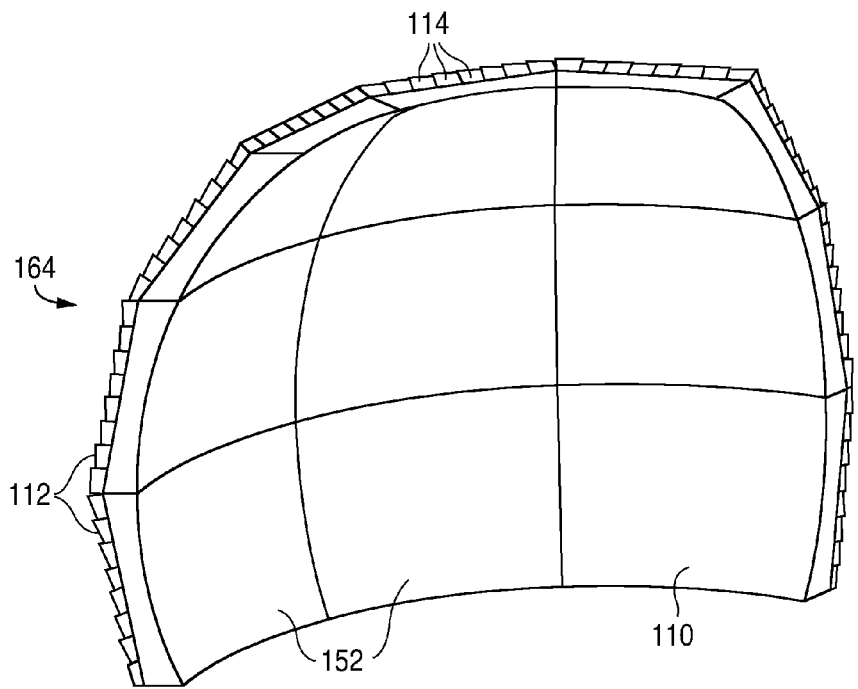

FIGS. 7a and 7b respectively illustrate the front and back of an example of a portion 164 of image-generating screen 102 used in the display system of the flight simulator of FIGS. 3 and 4. Screen portion 164 contains multiple units of light-emissive block facets 112 arranged in approximately spherically curved rows and columns. There are three curved rows of block facets 112 and three curved columns of block facets 112 in this example. Block facets 112 in each block facet row touch, or nearly touch, block facets 112 in each adjacent block facet row. Similarly, block facets 112 in each block facet column touch, or nearly touch, block facets 112 in each adjacent block facet column. Block facets 112 in screen portion 164 are connected together through their block backplates 152 which form part of curved backplate 110 of screen 102.

Maximum light-intensity directions 158 of light-emissive block facets 112 in screen portion 164 are materially slanted relative to one another. This is achieved by arranging back surfaces 154 of block facets 112 in screen portion 164 to be materially slanted relative to one another so that back block surfaces 154 approximate a three-dimensional spherically curved surface. Block facets 112 of screen portion 164 are, as a group, thus shaped approximately like a thin shell of spherical curvature.

Back-surface perpendicular lines 160 of each pair of adjacent light-emissive block facets 112 in screen portion 164 are at a small block-facet tilt angle $\beta$ to each other. Consequently, maximum light-intensity directions 158 of each pair of adjacent block facets 112 are at block-facet tilt angle $\beta$ to each other. Since block facets 112 are largely identical and since adjacent block facets 112 touch, or nearly touch, one another, block-facet angle $\beta$ is largely the same for each pair of adjacent block facets 112. Block-facet tilt angle $\beta$ is normally 0.1°-2° depending on various factors including the radius of curvature of screen portion 164, the lateral area occupied by each block facet 112, and the tilt of collimator 104 to screen 102.

The values of block-facet tilt angles $\beta$ collectively largely match the tilt of the spherically curved surface of collimating mirror 104 relative to the spherically curved surface approximated by back block surfaces 156 of light-emissive block facets 112 in image-generating screen 102. As a result the collimator-to-screen tilt is largely nulled out. The light provided from screen 102 to collimator 104 is at largely at the maximum intensity.

To facilitate manufacturing, image-generating screen 102 is preferably divided into multiple tiles, each consisting of multiple light-emissive block facets 112. Each tile provides part of the image generated by screen 102. Screen portion 164 in FIGS. 7a and 7b could, for instance, be a tile. The manufacture of screen 102 entails fabricating light-emissive modules 114, mounting modules 114 on block backplates 152 to form block facets 112, combining multiple block facets 112 to form the tiles, and then combining the tiles to form screen 102.

Figure 8:
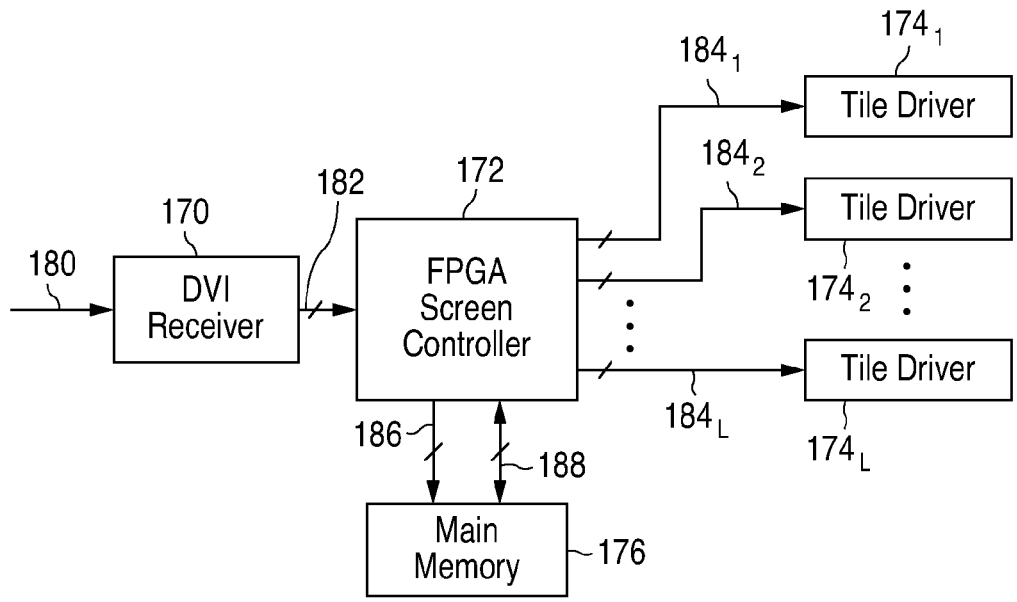
FIG. 8 is a block diagram of the overall electronic circuitry used for controlling the video image in the display system of the flight simulator of FIGS. 3 and 4.

FIG. 8 illustrates the overall electronic circuitry, referred to as the screen driver, used for controlling the video image actively generated by screen 102 in the display system of the flight simulator of FIGS. 3 and 4. The screen driver consists of a digital visual interface ("DVI") receiver 170, a field-programmable gate array ("FPGA") screen controller 172, a group of L tile drivers 174$_1$, 174$_2$, . . . and 174$_L$, and a main memory 176 that together process a digital video input signal 180. DVI receiver 170, FPGA screen controller 172, and main memory 176 are physically located in screen supporting structure 106. Tile drivers 174₁-174_L are located partially in supporting structure 106 and partially in screen backplate 110 as described further below.

DVI receiver 170 receives video input signal 180 and buffers it to produce a buffered video signal 182. FPGA screen controller 172 regionalizes buffered video signal 182 to produce L tile-driver input signals 184₁, 184₂, . . . and 184_L for the tiles in image-generating screen 102. Letting i be an integer running from 1 to L, each tile-driver input signal 184_i is provided to corresponding tile driver 174_i. Screen controller 172 also provides all the control signals for the tiles. This control information is included in tile-driver input signals 184₁-184_L. Item 186 in FIG. 8 indicates address information provided from screen controller 172 to main memory 176 for accessing data-storage sites in memory 176. Item 188 indicates data transferred between screen controller 172 and main memory 176.

Figure 9:
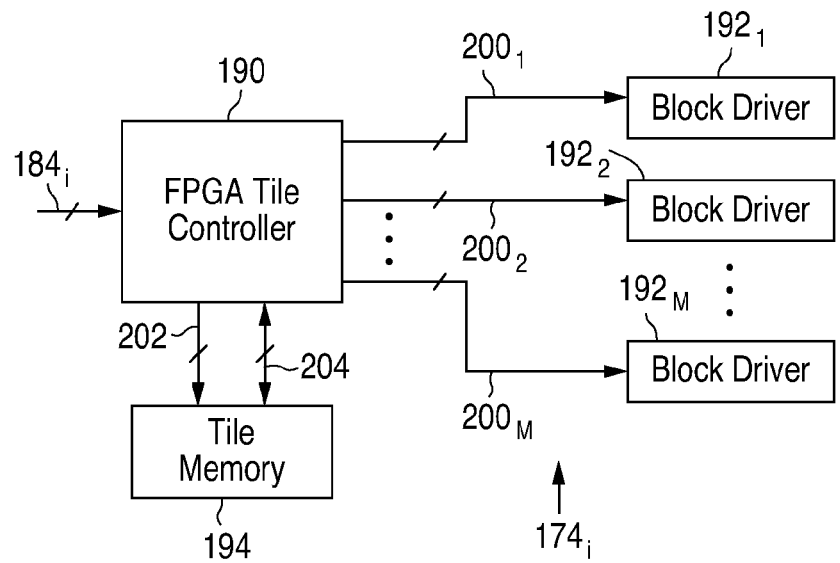
FIG. 9 is a block diagram of one of the tile drivers in the electronic circuitry of FIG. 8.

The components of a tile driver 174_i are illustrated in FIG. 9. Tile driver 174_i is formed with an FPGA tile controller 190, a group of M block drivers 192₁, 192₂, . . . and 192_M, and a tile memory 194 that together process tile-driver input signal 184_i for driving a corresponding one of the tiles to generate the corresponding part of the image. FPGA tile controller 190 and tile memory 194 are physically located in screen supporting structure 106. Block drivers 192₁-192_M, which respectively drive light-emissive block facets 112, are located in screen backplate 110. Letting j be an integer running from 1 to M, each block driver 192_j is normally located largely in block backplate 152 of block facet 112 driven by that block driver 192_j.

FPGA tile controller 190 regionalizes tile-driver input signal 184_i to produce M block-driver input signals 200₁, 200₂, . . . and 200_M for light-emissive block facets 114 in the tile driven by tile driver 174_i. Tile controller 190 also provides all the control signals for block facets 114. This control information is included in block-driver input signals 200₁-200_M. Item 202 in FIG. 9 indicates address information provided from tile controller 190 to tile memory 194 for accessing data-storage sites in memory 194. Item 204 indicates data transferred between tile controller 190 and tile memory 194 for the portion of the video image present in the tile driven by tile driver 174_i.

Figure 10:
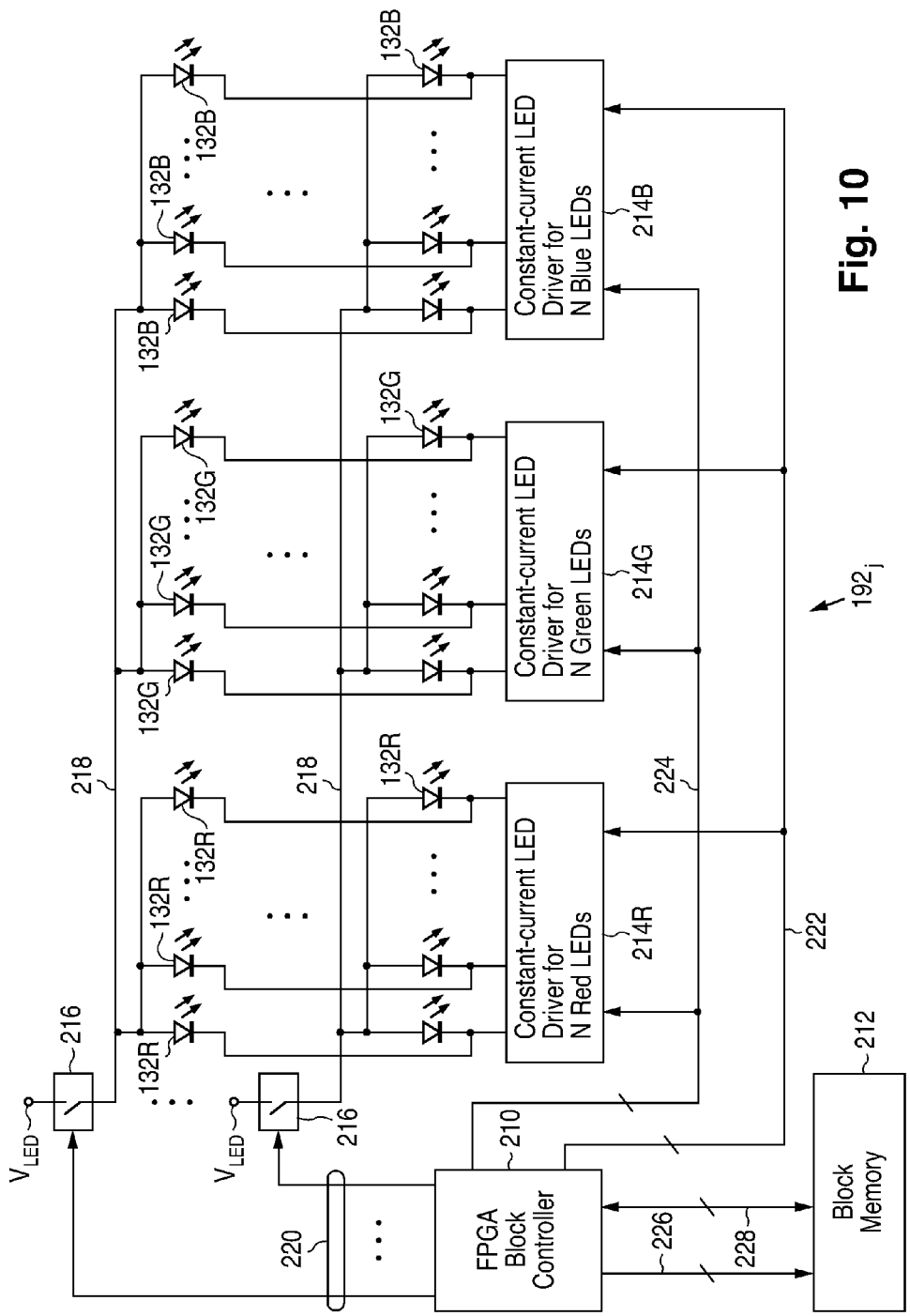
FIG. 10 is a block diagram of one of the block drivers in the tile driver of FIG. 9.

The components of a block driver 192_j are illustrated in FIG. 10. Illustrated Nock driver 192j consists of an FPGA block controller 210, a block memory 212, a constant-current LED driver 214R for N red-emitting LEDs 132R, a constant-current LED driver 214G for N green-emitting LEDs 132G, a constant-current LED driver 214B for N blue-emitting LEDs 132B, and a group of high-side switches 216, one for each row of light-emissive modules 114 in block facet 112 controlled by that block driver 192. Taking note that, as described below, only one row of light-emissive modules 114 in each block facet 112 is activated at a time N is the number of columns of modules 114 in that block facet 112.

Red-emitting LEDs 132R in each row of light-emissive modules 114 are cathode-to-anode connected as a group between constant-current LED driver 214R and a row electrical conductor 218 to high-side switch 216 for that module row. Green-emitting LEDs 132G in each row of modules 114 are similarly cathode-to-anode connected as a group between constant-current LED driver 214G and that row's electrical conductor 218. Blue-emitting LEDs 132B in each module row are likewise similarly cathode-to-anode connected as a group between constant-current LED driver 214B and that row's conductor 218. High-side switches 216 receive a high LED voltage $V_{LED}$.

FPGA block controller 210 provides high-side switches 216 with a group of switching signals 220 that cause one row of light-emissive modules 114 to be activated at a time. In particular, high-side switch 216 for the selectively activated row of modules 114 provides LED voltage $V_{LED}$ to LEDs 132R, 132G, and 132B in the activated module row via that row's electrical conductor 218. The module rows are normally activated sequentially going through the module rows from top to bottom or bottom to top.

Block controller 210 provides constant-current LED drivers 214R, 214G, and 214B with a group of control signals 222 and a group of data signals 224. LED drivers 214R, 214G, and 214B appropriately transfer control signals 222 and data signals 224 to LEDs 132R, 132G, and 132B in the activated module row. Control signals 222 include address signals for addressing selected ones of LEDs 132R, 132G, and 132B in the activated module row. Data signals 224 cause LEDs 132R, 132G, and 132B in the activated module row to respectively emit red, green, and blue light at selected intensities.

Item 226 in FIG. 10 indicates address information provided from block controller 210 to block memory 212 for accessing data-storage sites in memory 212. Item 228 indicates data transferred between block controller 210 and block memory 212 for the segment of the video image present in block facet 212 driven by block driver 192. Block controller 210, constant-current LED drivers 214R, 214G, and 214B, and high-side switches are situated in block backplate 152 of that block facet 112. Block memory 212 can be integrated with, or separate from, block controller 212.

One embodiment of the flight-simulation display system of FIGS. 3 and 4 has the following numerical characteristics. The spherically curved surface approximated by image-generating screen 102 has a radius of 175-178 cm. Back surface 136 of supporting body 130 of each light-emissive module 114 is a square having sides 1.6 mm long. Each light-emissive block facet 112 contains 1,024 largely identical modules 114 arranged in 32 rows and 32 columns. Module tilt angle α is approximately 35°. Block-facet tilt angle β is then approximately 1°.

Each of constant-current LED drivers 214R, 214G, and 214B in the preceding embodiment of the flight simulation display system of FIGS. 3 and 4 is typically implemented with a pair of the TLC5946 LED driver integrated circuits made by Texas Instruments. Consequently, each block facet 112 contains six TLC5946 driver integrated circuits. LED drivers 214R, 214G, and 214B then use pulse-width modulation ("PWM") to control LEDs 132R, 132G, and 132B. See "TLC5946, 16-Channel, 12-Bit PWM LED Driver with 6-Bit Dot Correction", Texas Instruments, June 2008, 39 pages.

Figure 1:
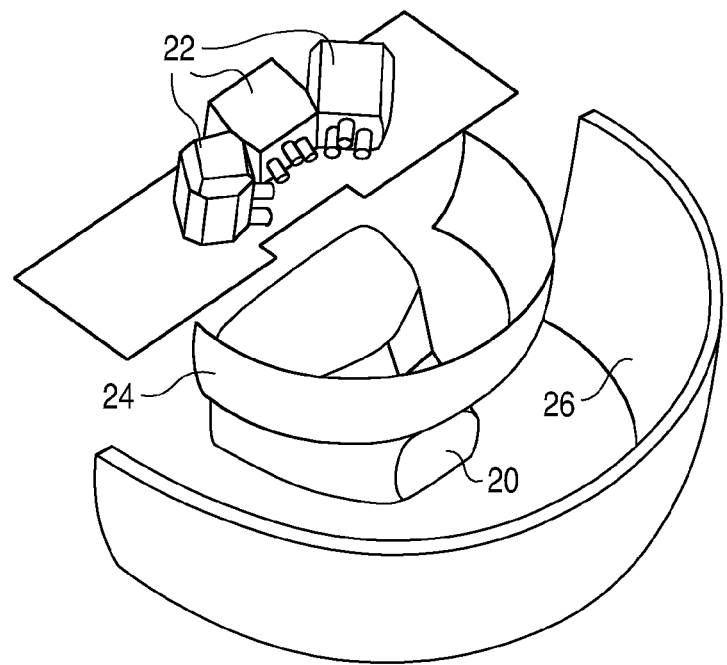
FIG. 1 is a perspective view of a conventional projector-based cross-cockpit flight simulator.
Figure 2:
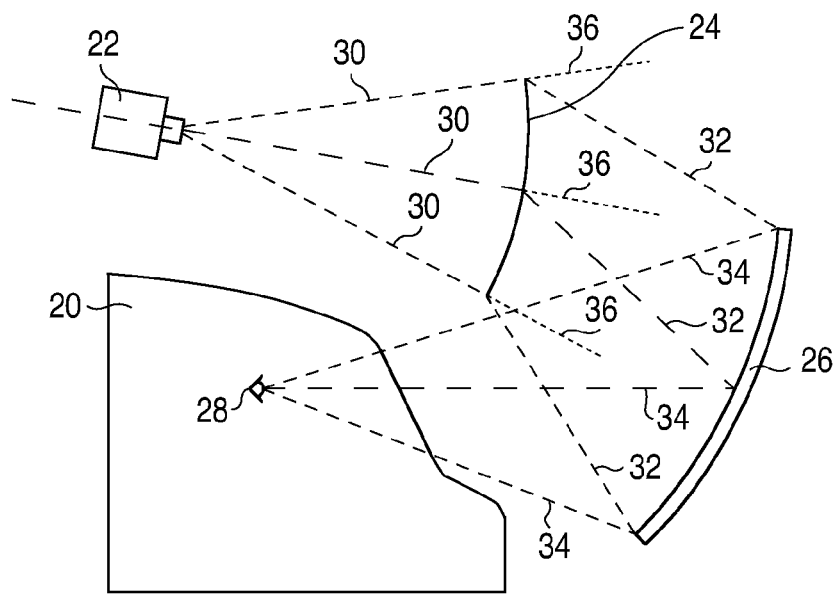
FIG. 2 is a side view of the conventional flight simulator of FIG. 1. The side view is taken along a vertical plane through the projection axis of one of the video projectors.

The cross-cockpit LED-based flight-simulation display system of FIGS. 3 and 4, as implemented with the components of FIGS. 5-10, performs much better than conventional cross-cockpit projector-based flight-simulation display systems such as that of FIGS. 1 and 2. Using only a ½₀₀ PWM duty cycle, the flight-simulation display system of FIGS. 3 and 4 can readily be twice as bright as the conventional flight-simulation display system of FIGS. 1 and 2. A sub-pixel formed with an LED emits virtually no light and is therefore almost totally black when the LED is turned off. Consequently, the LED-based display system of FIGS. 3 and 4 has a better (higher) contrast ratio than a projector-based display system.

The projectors used in conventional cross-cockpit projector-based collimated display systems normally use arc lamps as light sources. Arc lamps have much less color saturation, i.e., are much less colorful, than LEDs. The cross-cockpit LED-based display system of FIGS. 3 and 4 therefore has a richer color gamut, and can display more colors with the same video signal, than a conventional cross-cockpit arc-lamp projector-based collimated display system.

The lifetime of arc lamps used in most video projectors is several thousand hours whereas the lifetime of the LEDs is typically 50,000 to 100,000 hours. This in itself produces at least an order of magnitude greater lifetime for the LED-based display system of FIGS. 3 and 4. The lifetime increase of the LED-based display system of FIGS. 3 and 4 is expected to be even higher because its PWM duty cycle can be quite low, e.g., 1/500. The cost of maintaining the LED-based display system of FIGS. 3 and 4 is substantially lower than that of a conventional projector-based display system.

The LED-based display system of FIGS. 3 and 4 avoids many problems that arise with projector-based display systems. In particular, the LED-based display system of FIGS. 3 and 4 does not need to handle brightness, contrast, and color match between different projectors. Concerns with overcoming image degradation in blend zones due to multiple projectors are avoided with the LED-based display system of FIGS. 3 and 4.

Small differences in grayscale intensity under overall low luminance level need to be distinguished during night-vision flight-simulation training. Due to the enhanced contrast provided with the LED-based display system of FIGS. 3 and 4, it provides more gray levels for the night-vision simulation than a conventional projector-based display system with an arc-lamp light source.

While the invention has been described with reference to preferred embodiments, this description is solely for the purpose of illustration and is not to be construed as limiting the scope of the invention claimed below. For instance, the display system of FIGS. 3 and 4 can be utilized in other motion simulators, such as marine (boat/ship) and land (motor vehicle) simulators, which employ curved display screens. The display system of FIGS. 3 and 4 can also be employed in other high-end visualization commercial motion display applications, such as dome-based displays with 360° horizontal field of view and entertainment, game, scientific and medical displays where curved display screens are suitable.

Image-generating screen 102 may be combined with other structure, e.g., structure which provides an electronic function or/and physically supports screen 102, to produce a composite image-generating structure not shaped generally like a thin shell. The pixels of screen 102 can be distributed across screen 102 in ways other than the latitude/longitude way described above.

Each block facet 112 can utilize organic LEDs ("OLEDs") rather than surface-mount LEDs. In that case, light-emissive modules 114 of each block facet 112 can be replaced with a sheet of OLEDs arranged in rows and columns of OLED pixels. Each OLED pixel then normally contains one red-emitting OLED, one green-emitting OLED, and one blue-emitting OLED. The activation of the OLEDs in each block facet 112 can be controlled in largely the same way as described above in connection with FIG. 10. Various changes and applications may thus be made without departing from the true scope of the invention as defined in the appended claims.

We claim:

1. A display system comprising:
    an image-generating screen comprising a plurality of light-emissive components connected together for actively generating an image, each light-emissive component having a light-providing surface and a further surface, referred to as the back surface, generally opposite the light-providing surface, light emitted from each light-emissive component emanating from its light-providing surface with an intensity having a maximum that occurs in a maximum light-intensity direction materially non-perpendicular to that component's back surface, the components' back surfaces being materially slanted relative to one another so as to approximate a three-dimensional curved surface whereby the components' maximum light-intensity directions are materially slanted relative to one another and;
    a collimator having a curved surface for reflectively collimating light emitted from the light-emissive components and provided from the image-generating screen in order to substantially replicate the image, the curved surface of the collimator being tilted relative to the curved surface approximated by the back surfaces of the light-emissive components, the maximum light-intensity directions of the light-emissive components differing from being respectively perpendicular to the components' back surfaces by angles that collectively largely match the tilt of the curved surface of the collimator relative to the curved surface approximated by the components' back surfaces.

2. A display system as in claim 1 wherein the light-emissive components are, as a group, shaped approximately like a thin shell.

3. A display system as in claim 1 wherein the curved surface approximated by the back surfaces of the light-emissive components is of spherical curvature.

4. A display system as in claim 3 wherein the curved surface of the collimator is approximately spherical.

5. A display system as in claim 1 wherein the angles by which the maximum light-intensity directions of the light-emissive components differ from being respectively perpendicular to the components' back surfaces are approximately equal.

6. A display system as in claim 1 wherein each light-emissive component comprises a plurality of modules each comprising:
    a supporting body having a mounting surface and a further surface, referred to as the back surface, generally opposite the mounting surface; and
    a light-providing device, mounted on the body's mounting surface, for providing light at an intensity having a maximum that occurs largely in that component's maximum light-intensity direction.

7. A display system as in claim 6 wherein the back surfaces of the supporting bodies of the modules in each light-emissive component extend largely parallel to one another and materially non-perpendicular to that component's maximum light-intensity direction.

8. A display system as in claim 6 wherein:
    the modules of each light-emissive component are arranged in rows and columns; and
    the mounting surfaces of the supporting bodies of the modules in each column of modules in that component extend generally in respective largely coplanar planes spaced apart from one another.

9. A display system as in claim 8 wherein the mounting surfaces of the supporting bodies of the modules in each row of modules in each light-emissive component are largely coplanar.

10. A display system as in claim 6 wherein the light-providing device of each module comprises at least one light-emissive element for emitting light of largely a selected color.

11. A display system as in claim 10 wherein each light-emissive element comprises a light-emitting diode.

12. A display system as in claim 6 wherein the light-providing device of each module comprises three light-emissive elements which respectively emit light of three selected colors capable of being combined to produce white light.

13. A display system as in claim 6 wherein the three selected colors of light provided by each module's light-providing device are red, green, and blue.

14. A display system as in claim 6 wherein the supporting bodies contain electronic circuitry for controlling light provided from the light-providing devices.

15. A display system comprising:
a curved image-generating screen comprising a multiplicity of light-emitting diodes ("LEDs") for generating an image, the LEDs being deployed among a plurality of light-emissive components connected together, each light-emissive component having a light-emissive surface and a further surface, referred to as the back surface, generally opposite the light-emissive surface, light emanating from the light-emissive surface of each light-emissive component with an intensity having a maximum that occurs in a maximum light-intensity direction materially non-perpendicular to that component's back surface, the components' back surfaces being materially slanted relative to one another so as to approximate a three-dimensional curved surface of spherical curvature whereby the components' maximum light-intensity directions are materially slanted relative to one another; and
a collimator having a curved surface of approximately spherical curvature for reflectively collimating light provided from the LEDs and emitted from the light-emissive components in order to substantially replicate the image, the curved surface of the collimator being tilted relative to the curved surface approximated by the back surfaces of the light-emissive components, the maximum light-intensity directions of the light-emissive components differing from being respectively perpendicular to the components' back surfaces by angles that collectively largely match the tilt of the curved surface of the collimator relative to the curved surface approximated by the components' back surfaces.

16. A display system as in claim 15 wherein the light-emissive components are, as a group, shaped approximately like a thin shell.

17. A display system as in claim 15 wherein the angles by which the maximum light-intensity directions of the light-emissive components differ from being respectively perpendicular to the components' back surfaces are approximately equal.

18. A display system as in claim 15 wherein each light-emissive component comprises a plurality of modules each comprising:
a supporting body having a mounting surface and a further surface, referred to as the back surface, generally opposite the mounting surface; and
a light-emissive device, mounted on the body's mounting surface, for emitting light at an intensity having a maximum that occurs largely in that component's maximum light-intensity direction, each light-emissive device comprising a different one of the LEDs.

19. A display system as in claim 18 wherein the back surfaces of the supporting bodies of the modules in each light-emissive component extend largely parallel to one another and materially non-perpendicular to that component's maximum light-intensity direction.

20. A display system as in claim 18 wherein:
the modules of each light-emissive component are arranged in rows and columns; and
the mounting surfaces of the supporting bodies of the modules in each column of modules in that component extend generally in respective largely coplanar planes spaced apart from one another.

21. A display system as in claim 20 wherein the mounting surfaces of the supporting bodies of the modules in each row of modules in each light-emissive component are largely coplanar.

22. A display system as in claim 18 wherein three of the LEDs are present in the light-emissive device of each module, those three LEDs respectively emitting light of three selected colors capable of being combined to produce white light.

23. A display system as in claim 22 wherein the three selected colors of light provided by the three LEDs in each module's light-emissive device are red, green, and blue.

24. A motion simulator comprising:
a display system comprising (a) an image-generating screen comprising a plurality of light-emissive components connected together for actively generating an image, each light-emissive component having a light-providing surface and a further surface, referred to as the back surface, generally opposite the light-providing surface, light emitted from each light-emissive component emanating from its light-providing surface with an intensity having a maximum that occurs in a maximum light-intensity direction materially non-perpendicular to that component's back surface, the components' back surfaces being materially slanted relative to one another so as to approximate a three-dimensional curved surface whereby the components' maximum light-intensity directions are materially slanted relative to one another and (b) a collimator having a curved surface for reflectively collimating light emitted from the light-emissive components and provided from the image-generating screen in order to substantially replicate the image, the curved surface of the collimator being tilted relative to the curved surface approximated by the back surfaces of the light-emissive components, the maximum light-intensity directions of the light-emissive components differing from being respectively perpendicular to the components' back surfaces by angles that collectively largely match the tilt of the curved surface of the collimator relative to the curved surface approximated by the components' back surfaces; and
a station for receiving a person such that the person can see the replicated image by receiving light collimated by the collimator after being emitted from the light-emissive components.

25. A simulator as in claim 24 wherein the collimator presents a moving picture as seen from the cockpit of an airplane.

26. A simulator as in claim 24 wherein each light-emissive component comprises a plurality of modules each comprising:
a supporting body having a mounting surface and a further surface, referred to as the back surface, generally opposite the mounting surface; and
a light-providing device, mounted on the body's mounting surface, for providing light at an intensity having a maximum that occurs largely in that component's maximum light-intensity direction.

27. A simulator as in claim 26 wherein:
the modules of each light-emissive component are arranged in rows and columns; and the mounting surfaces of the supporting bodies of the modules in each column of modules in that component extend generally in respective largely coplanar planes spaced apart from one another.

28. A simulator as in claim 27 wherein the mounting surfaces of the supporting bodies of the modules in each row of modules in each light-emissive component are largely coplanar.

29. A simulator as in claim 26 wherein the light-providing device of each module comprises at least one light-emissive element for emitting light of largely a selected color.

30. A simulator as in claim 26 wherein the light-providing device of each module comprises three light-emissive elements which respectively emit light of three selected colors capable of being combined to produce white light.

31. A simulator as in claim 30 wherein the three selected colors of light provided by each module's light-providing device are red, green, and blue.

32. A simulator as in claim 26 wherein the supporting bodies contain electronic circuitry for controlling light provided from the light-providing devices.

33. A simulator as in claim 24 wherein the curved surface approximated by the back surfaces of the light-emissive components is of spherical curvature.

34. A simulator as in claim 33 wherein the curved surface of the collimator is approximately spherical.

35. A simulator as in claim 24 wherein the angles by which the maximum light-intensity directions of the light-emissive components differ from being respectively perpendicular to the components' back surfaces are approximately equal.

36. A motion simulator comprising:
a display system comprising (a) a curved-image-generating screen comprising a multiplicity of light-emitting diodes ("LEDs") for generating an image, the LEDs being deployed among a plurality of light-emissive components connected together, each light-emissive component having a light-emissive surface and a further surface referred to as the back surface, generally opposite the light-emissive surface, light emanating from the light-emissive surface of each light-emissive component with an intensity having a maximum that occurs in a maximum light-intensity direction materially non-perpendicular to that component's back surface, the components' back surfaces being materially slanted relative to one another so as to approximate a three-dimensional curved surface of spherical curvature whereby the components' maximum light-intensity directions are materially slanted relative to one another, and (b) a collimator having a curved surface of approximately spherical curvature for reflectively collimating light emitted from the light-emissive components and provided from the image-generating screen in order to substantially replicate the image, the curved surface of the collimator being tilted relative to the curved surface approximated by the back surfaces of the light-emissive components, the maximum light-intensity directions of the light-emissive components differing from being respectively perpendicular to the components' back surfaces by angles that collectively largely match the tilt of the curved surface of the collimator relative to the curved surface approximated by the components' back surfaces; and
a station for receiving a person such that the person can see the replicated image by receiving light collimated by the collimator after being emitted from the light-emissive components.

37. A simulator as in claim 36 wherein the collimator presents a moving picture as seen from the cockpit of an airplane.

38. A simulator as in claim 36 wherein each light-emissive component comprises a plurality of modules each comprising:
a supporting body having a mounting surface and a further surface, referred to as the back surface, generally opposite the mounting surface; and
a light-emissive device, mounted on the body's mounting surface, for emitting light at an intensity having a maximum that occurs largely in that component's maximum light-intensity direction, each light-emissive device comprising a different one of the LEDs.

39. A simulator as in claim 38 wherein:
the modules of each light-emissive component are arranged in rows and columns; and
the mounting surfaces of the supporting bodies of the modules in each column of modules in that component extend generally in respective largely coplanar planes spaced apart from one another.

40. A simulator as in claim 39 wherein the mounting surfaces of the supporting bodies of the modules in each row of modules in each light-emissive component are largely coplanar.

41. A simulator as in claim 38 wherein three of the LEDs are present in the light-providing device of each module, those three LEDs respectively emitting light of three selected colors capable of being combined to produce white light.

42. A simulator as in claim 41 wherein the three selected colors of light provided by the three LEDs in each module's light-providing device are red, green, and blue.

43. A simulator as in claim 38 wherein the supporting bodies contain electronic circuitry for controlling light provided from the light-emissive devices.

44. A simulator as in claim 36 wherein the angles by which the maximum light-intensity directions of the light-emissive components differ from being respectively perpendicular to the components' back surfaces are approximately equal.

* * * * *